(12) United States Patent
Sin et al.

(10) Patent No.: US 6,381,095 B1
(45) Date of Patent: Apr. 30, 2002

(54) HIGH PERFORMANCE THIN FILM MAGNETIC WRITE ELEMENT HAVING HIGH BSAT POLES AND METHOD FOR MAKING SAME

(75) Inventors: Kyusik Sin, Palo Alto; Ronald Barr, Mountain View, both of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/386,889

(22) Filed: Aug. 31, 1999

(51) Int. Cl.$^7$ .............................................. G11B 5/147
(52) U.S. Cl. ........................ 360/126; 360/122; 360/123
(58) Field of Search .................................. 360/126, 122, 360/123, 317

(56) References Cited

U.S. PATENT DOCUMENTS

| | | |
|---|---|---|
| 4,318,148 A | 3/1982 | Kaminaka et al. |
| 4,416,056 A | 11/1983 | Takahashi |
| 4,943,882 A | 7/1990 | Wada et al. |
| 5,059,278 A | 10/1991 | Cohen et al. |
| 5,184,394 A | 2/1993 | Hsie et al. |
| 5,435,053 A | 7/1995 | Krounbi et al. |
| 5,473,491 A * | 12/1995 | Fujisawa et al. ............. 360/126 |
| 5,691,867 A | 11/1997 | Onuma et al. |
| 5,700,380 A | 12/1997 | Krounbi et al. |
| 5,779,923 A | 7/1998 | Krounbi et al. |
| 5,793,578 A | 8/1998 | Heim et al. |
| 6,151,193 A * | 11/2000 | Terunuma et al. .......... 360/126 |
| 6,163,436 A * | 12/2000 | Saski et al. ................. 360/126 |

* cited by examiner

*Primary Examiner*—Robert S. Tupper
(74) *Attorney, Agent, or Firm*—Carr & Ferrell LLP; Robert D. Hayden; John S. Ferrell

(57) ABSTRACT

A high performance magnetic write element incorporated in a read/write head having a lower pole including high Bsat back gap and write gap pedestals. The write element further including an upper pole connected with the lower pole to form a yoke and a coil disposed within the yoke and enclosed covered with a write gap material and surrounded by insulating material. The write gap material provides separation between the first and second poles at one end of the yoke to form a write gap therebetween. A method of forming the write element of the present invention includes forming the first pole and building thereupon a back gap pedestal and a write gap pedestal at back and front ends of the first pole respectively. A dielectric layer is deposited on top of the first pole and planarized to have an upper surface coplanar with the top of the first and second pedestals. Upon the dielectric layer the coil is formed on which is deposited the write gap material. The write gap material is deposited so as to cover both the back gap and write gap pedestals. An insulation layer is deposited over the write gap material and masked to avoid covering the pedestals. After curing the insulation layer, an etching process removes at the location of the back gap material. The upper pole can then be formed onto the structure to form the yoke. Covering back gap pedestal with write gap material until the insulation has been cured effectively prevents corrosion of the back gap pedestal which would otherwise be caused by the high temperatures necessary to cure the insulation layer.

34 Claims, 11 Drawing Sheets

HIGH PERFORMANCE THIN FILM MAGNETIC WRITE ELEMENT HAVING HIGH BSAT POLES AND METHOD FOR MAKING SAME

BACKGROUND OF THE INVENTION

This invention relates generally to magnetic disk data storage systems, and more particularly to magnetic write transducers and methods of making same.

Magnetic disk drives are used to store and retrieve data for digital electronic apparatuses such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other by a backgap portion 40, with these three elements collectively forming a yoke 41. The combination of a first pole tip portion 43 and a second pole tip portion 45 near the ABS are sometimes referred to as the yoke tip portion 46. A write gap 36 is formed between the first and second poles 32, 38 in the yoke tip portion 46. The write gap 36 is filled with a non-magnetic electrically insulating material that forms a write gap material layer 37. This non-magnetic material can be either integral with (as is shown here) or separate from a first insulation layer 47 that lies below the second yoke 38 and extends from the yoke tip portion 46 to the backgap portion 40.

Also included in write element 28 is a conductive coil 48, formed of multiple winds 49 which each have a wind height Hw. The coil 48 can be characterized by a dimension sometimes referred to as the wind pitch P, which is the distance from one coil wind front edge to the next coil wind front edge, as shown in FIG. 2A. As is shown, the wind pitch P is defined by the sum of the wind thickness Tw and the separation between adjacent winds Sw. The conductive coil 48 is positioned within a coil insulation layer 50 that lies above the first insulation layer 47. The first insulation layer 47 thereby electrically insulates the coil layer from the first pole 32, while the coil insulation layer 50 electrically insulates the winds 49 from each other and from the second pole 38.

The configuration of the conductive coil 48 can be better understood with reference to a plan view of the read/write head 24 shown in FIG. 2B taken along line 2B—2B of FIG. 2A. Because the conductive coil extends beyond the first and second poles, insulation may be needed beneath, as well as above, the conductive coil to electrically insulate the conductive coil from other structures. For example, as shown in FIG. 2C, a view taken along line 2C—2C of FIG. 2A, a buildup insulation layer 52 can be formed adjacent the first pole, and under the conductive coil layer 48. As is well known to those skilled in the art, these elements operate to magnetically write data on a magnetic medium such as a magnetic disk 16 (see Figs. 1A and 1B).

More specifically, an inductive write head such as that shown in FIGS. 2A–2C operates by passing a writing current through the conductive coil layer 48. Because of the magnetic properties of the yoke 41, a magnetic flux is induced in the first and second poles 32, 38 by write currents passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is a track width of the write element, which defines track density. For example, a narrower track width can result in a higher magnetic recording density. The track width is defined by geometries in the yoke tip portion 46 (see FIG. 2A) at the ABS. These geometries can be better understood with reference to FIG. 2C. As can be seen from this view, the first and second poles 32, 38 can have different widths W1, W2 respectively in the yoke tip portion 46 (see FIG. 2A). In the shown configuration, the track width of the write element 28 is defined by the width W2 of the second pole 38. The gap field of the write element can be affected by the throat height TH, which is measured from the ABS to the zero throat ZT, as shown in FIG. 2A. Thus, accurate definition of the track width and throat height is critical during the fabrication of the write element.

Another parameter of the write element is the number of winds 49 in the coil layer 48, which determines magnetic motive force (MMF) of a write element. With increasing number of winds 49 between the first and second poles 32, 38, the fringing field is stronger and, thus, the write performance increases. The number of winds is limited by the yoke length YL, shown in FIG. 2A, and the pitch P between adjacent winds 49. However, to obtain faster recording speeds, and therefore higher data transfer rates, it may be desirable to have a shorter yoke length YL because this can shorten the flux rise time. This relationship can be seen in the graph of yoke length YL versus flux rise time shown in FIG. 2D. Therefore, to maximize the number of coil winds while maintaining fast write speeds, it is desirable to minimize the pitch P in design of write elements.

However, the control of track width, throat height, and coil pitch can be limited by typical fabrication processes, an example of which is shown in the process diagram of FIG. 3. The method 54 includes providing a first pole with first and second edges in operation 56. This operation can include, for example, forming a plating dam, plating, and then removing the dam. In operation 58, a write gap material layer is formed over the first pole. In particular, the write gap material layer is formed over an upper surface and the first and second edges of the first pole. Also, in operation 58, a via is formed through the write gap material layer to the first pole in the backgap portion 40 (see FIG. 2A). In the instance herein described, the write gap material layer extends above the first pole in the area between the yoke tip portion and the backgap portion, although in other cases the write gap material layer may not be above this area. A buildup insulation layer is also formed in operation 60, adjacent the first and second edges, with the write gap material layer between the first pole and the buildup insulation layer. The buildup insulation layer is typically formed by depositing (e.g., spinning) and patterning photoresistive material and then hard baking the remaining photoresistive material. Such processes often result in the height of the buildup insulation layer being non-uniform and different than the height of the write gap material layer, as is illustrated in FIGS. 2A and 2C.

The method 54 also includes forming a first coil layer above the write gap material layer and the buildup insulation layer in operation 62. This can include first depositing a seed layer above the first pole. Typically, photoresistive material can then be deposited and patterned. With the patterned photoresistive material in place, conductive material can be plated. With removal of the photoresistive material, the remaining conductive material thereby forms the first coil layer.

Unfortunately, when there is a difference in height between the write gap material layer and the buildup insulation layer, the patterning of the photoresistive material for the first coil layer can be complicated. In particular, it can be difficult to pattern the various heights to have consistent geometries. More specifically, winds of the resulting first coil layer can be wider at lower levels than at higher levels, such as between the first and second poles. Thus, for a given pitch, such greater width at the lower levels can result in smaller distances between winds. This can, in turn, result in electrical shorting between winds which can be detrimental to the write element performance. To avoid such electrical shorting, the minimum wind pitch can be set to a desired value that will result in adequate yield of non-shorting conductive coil layers. Because the coil winds are more narrow between the first and second poles, the resulting pitch there is typically greater than, and limited by this minimum. For example, typical wind pitches between the first and second poles may be limited to no less than about 3 microns. For a given number of winds and wind thickness, this in turn limits the minimum yoke length, and thereby limits the data transfer rate and data density as described above. For example, a pitch of about 3 microns may be adequate for recording densities on the order of about 2 Gb/sq.in., however, these typical pitches can be inadequate for larger recording densities, such as about 10 Gb/sq.in.

In operation 64, the method 54 further includes forming a coil insulation layer above the first coil layer that is formed in operation 62. In addition, a second pole is formed above the coil insulation layer of operation 64, in operation 66.

Still another parameter of the write element is the stack height SH, the distance between the top surface of the first pole 32 and the top of the second pole 38, as shown in FIG. 2A. Of course, this height is affected by the thickness of the first insulation layer 47, the thickness of the coil layer 48 and any other coil layers that might be included, and the height of the coil insulation layer 50 and any other coil insulation layers that might be included. The stack height can be an indicator of the apex angle α, which partially characterizes the topology over which the second pole must be formed near the yoke tip portion. Typically, the reliability of the write element decreases as the apex angle α increases. This is due, at least in part, to the corresponding increased difficulty, particularly in the yoke tip portion 46, of forming the second pole 38 over the higher topography of the stack. For example, the definition of the second pole width W, shown in FIG. 2C, including photoresist deposition and etching, can be decreasingly reliable and precise with increasing topography. When demand for higher density writing capabilities drives yoke tip portions to have smaller widths W, this aspect of fabrication becomes increasingly problematic.

Greater track width control can be attempted using other processes such as focused ion beam (FIB) milling, however such processes can be expensive. To support higher data transfer rate applications, the second pole can otherwise be formed by lamination, which can be more time consuming than without lamination. Alternatively, the track width can be defined by the first pole width W1. However, such processes can also be expensive, complex, and result in lower production yields.

Also, with higher topography, when the second pole is formed, for example by sputtering or plating, the material properties of the second pole in the sloped region, adjacent the second pole tip region 45, can be undesirable. Thus, this decreased reliability results in undesirable lower production yield.

As will be appreciated from the above, the performance of a write head is limited by manufacturing limitations such as minimum coil pitch and stack height limitations. Therefore, methods are needed to increase the magnetic performance of a write head in spite of these manufacturing limitations. One possible method of increasing the magnetic performance of a write head in spite of the manufacturing limitations described above is to use very highly magnetic materials such as $Ni_{45}Fe_{55}$ in the construction of the poles. However such materials, being highly corrosive present their own manufacturing challenges. For example, the high temperatures required to cure the insulation layer deposited on the coil causes such highly magnetic materials to corrode. Therefore there remains a need for a magnetic read write head which takes advantage of the magnetic performance properties of high Bsat materials while addressing the corrosion problems inherent in such materials.

SUMMARY OF THE INVENTION

The present invention is embodied in a write head having first and second poles which together join to form a yoke. The first pole has respective write gap and back gap pedestals extending from its top surface at its front and back ends. The pedestals are constructed of a high Bsat material such as $Ni_{45}Fe_{55}$ which greatly enhances the magnetic properties of the yoke by promoting efficient magnetic flux concentration in the write gap portion at the front of the yoke. The write head is produced by a process whereby the pedestals are covered with a write gap material during cure of a subsequently deposited insulation layer. The write gap material is then removed from the back gap pedestal, exposing a surface of the back gap pedestal for contact with the second pole. Covering the pedestals with the write gap material protects the pedestals from corrosion during the high temperature cure of the insulation layer.

More particularly, the space surrounding the pedestals on top of the first pole is covered with a dielectric layer which is planarized by a chemical mechanical polishing process to create a smooth flat surface across the top of the dielectric layer as well as the tops of the pedestals. Upon this planarized surface of the dielectric layer the coil is formed. First, a copper seed layer is deposited. Then a copper coil is deposited onto the seed by a photolithographic plating process. The coil is provided with a pair of contacts for supplying electrical current to the coil. After the coil has been deposited, the seed is removed by an etching process.

With the coil formed on the dielectric layer and the seed removed, the layer of write gap material in the form of $SiO_2$ is deposited over the dielectric layer and coil as well as the top of both pedestals. By depositing the write gap material on top of the coil rather than beneath it, the thickness of the write gap material can be more closely controlled. This is because the write gap material will not be attacked by the etching process used to remove the seed layer which was deposited in order to form the coil.

The insulation layer is then deposited on top of the coil. In order to ensure that the insulation will adhere to the write gap material a very thin layer of HMDS is first deposited onto the write gap material. The insulation layer is then deposited as a photoresist which is spun onto the coil and masked to provide vias over the pedestals and coil contacts. The insulation is also masked to provide vias over the coil contacts. This is followed by a cure process which involves subjecting the insulation layer to high temperatures. Using $SiO_2$ as the write gap material advantageously causes the cured insulation to have a smooth gradual slope at its front end adjacent the write gap pedestal.

After the insulation has been cured, the write gap material can be locally removed at the locations of the back gap pedestal and the contacts for coil and sensor leads. This is accomplished by an etching process such as a reactive ion etch or ion beam etch. Keeping the high Bsat pedestals covered with write gap material during the high temperature cure of the insulation layer prevents corrosion of the pedestals. The write gap material can then be locally removed to expose the back gap pedestal without significantly effecting the back gap pedestal. Thus the corrosion problem inherent in using high Bsat materials in the poles of a write head is efficiently overcome.

A second pole is then formed on top of the insulation layer and over the write gap material in the write gap portion at the front of the first pole. The second pole contacts the exposed top of the back gap pedestal, whereby the first and second poles together form the yoke. As will be appreciated by those skilled in the art, the smooth slope of the insulation layer will cause the second pole to define a low apex angle, contributing to the magnetic performance and reliability of the write head. The second pole can also be constructed of $Ni_{80}Fe_{20}$, which can be deposited by conventional plating processes, or alternatively can be constructed of high Bsat materials such as $Ni_{45}Fe_{55}$ deposited by a plating process. The use of sputter deposited high Bsat materials is made possible by the low apex angle provided by the present invention.

As will be appreciated the present invention provides a write head which can take advantage of the excellent magnetic properties of high Bsat materials while solving the corrosion problems inherent in such materials. Also, the present invention provides improved control of write gap thickness as well as reduced apex angle. These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like references numerals designating like elements.

DESCRIPTION OF THE PREFERRED EMBODIMENTS

Figure 1A:
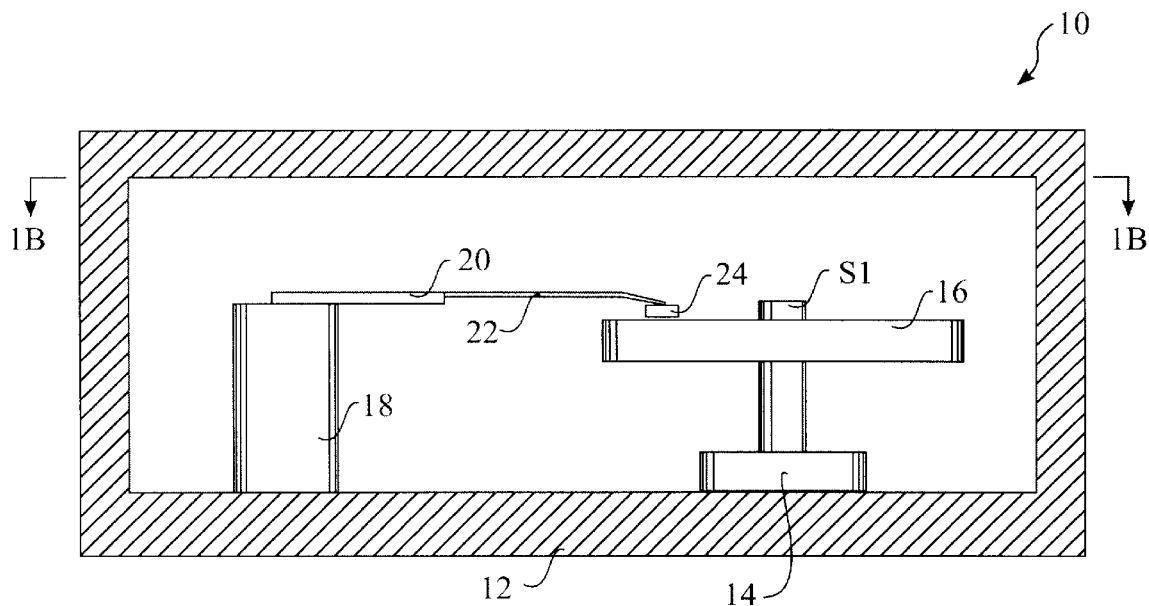
FIG. 1A is a partial cross-sectional front elevation view of a magnetic data storage system.
Figure 1B:
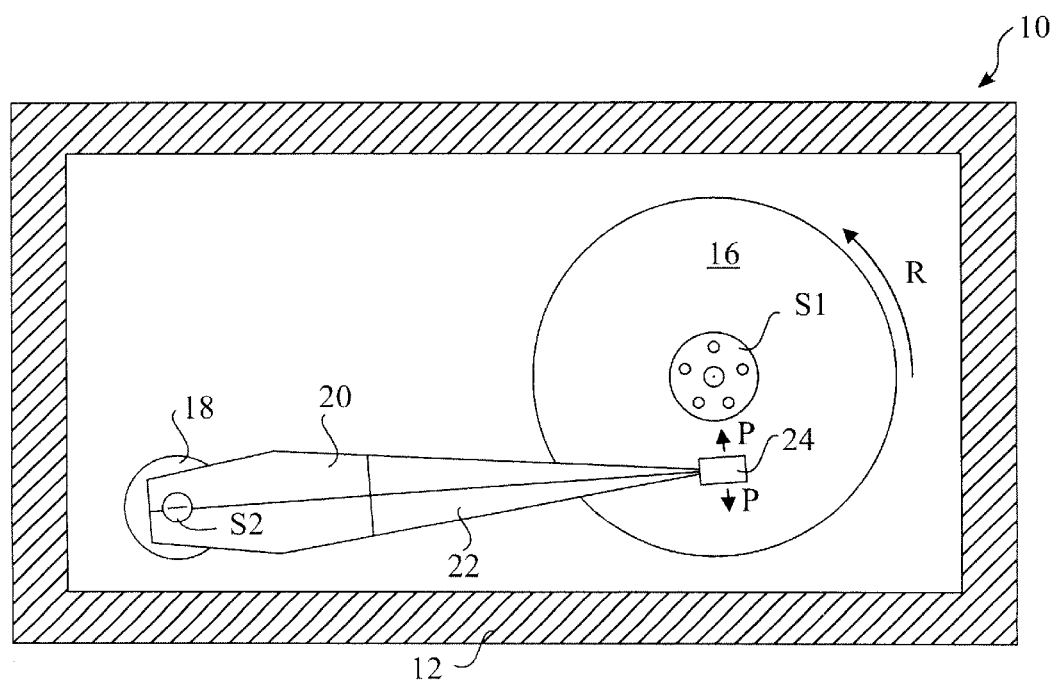
FIG. 1B is a top plan view taken along line 1B—1B of FIG. 1A.
Figure 2A:
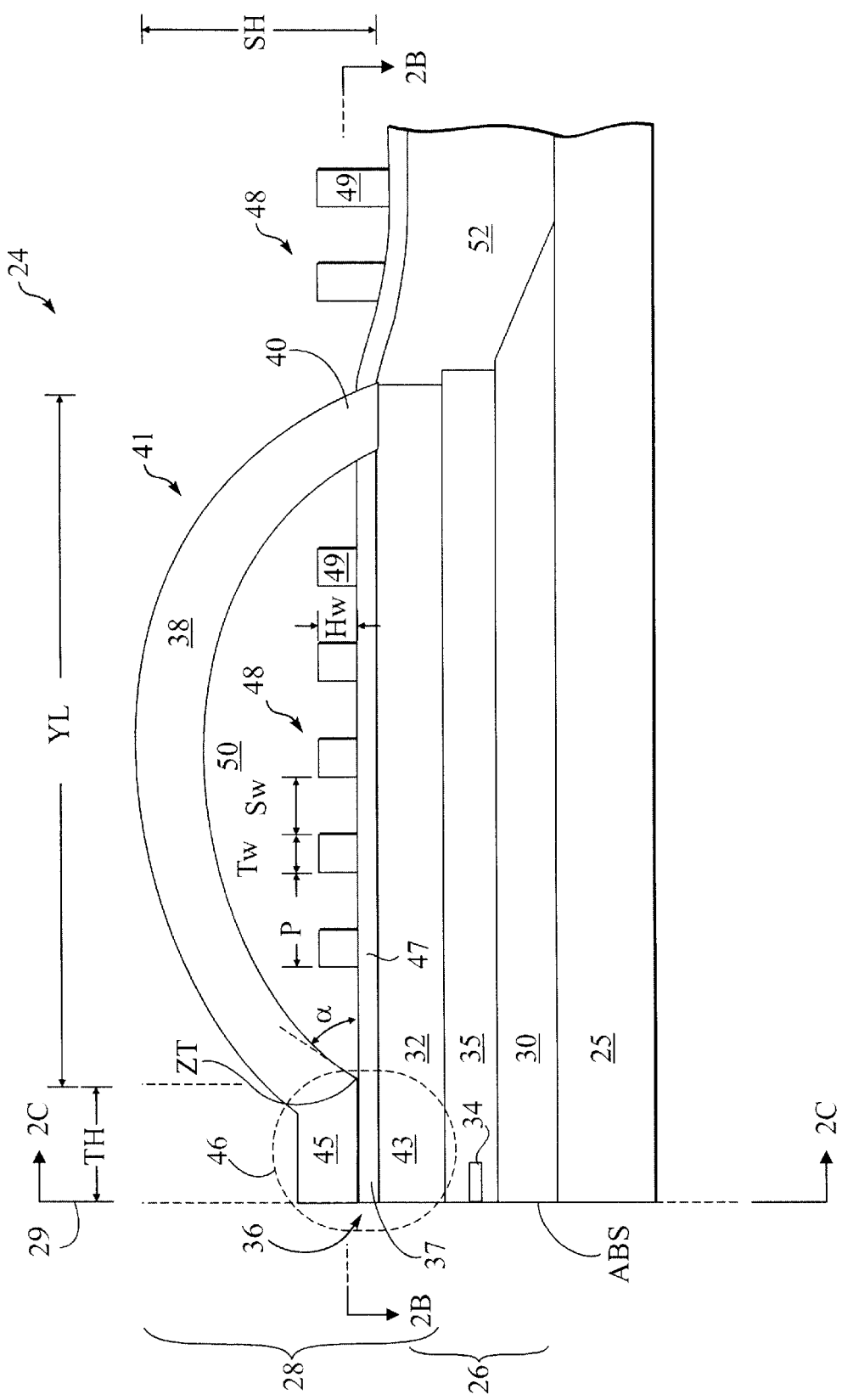
FIG. 2A is a cross-sectional view of a prior art read/write head of the magnetic disk drive assembly of FIGS. 1A and 1B.
Figure 2B:
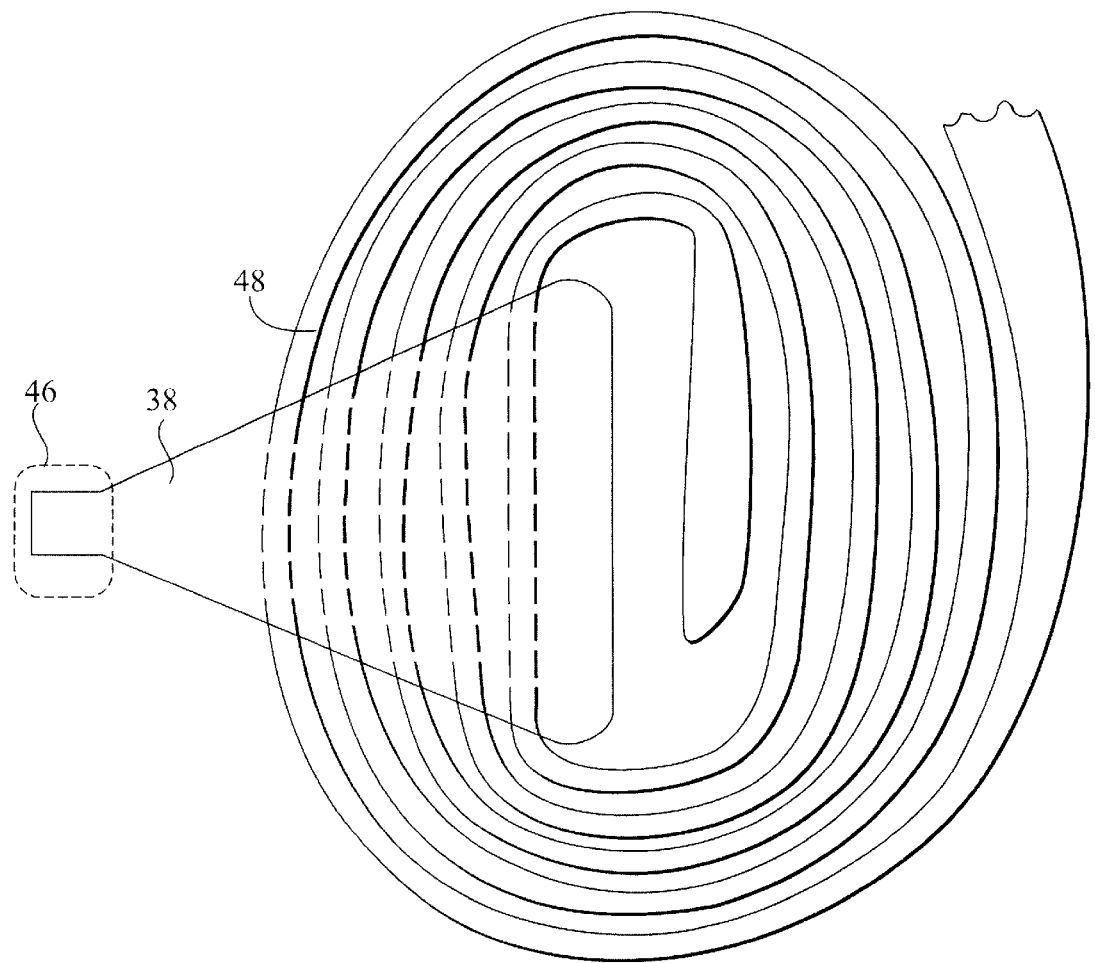
FIG. 2B is a plan view taken along line 2B—2B of FIG. 2A.
Figure 2C:
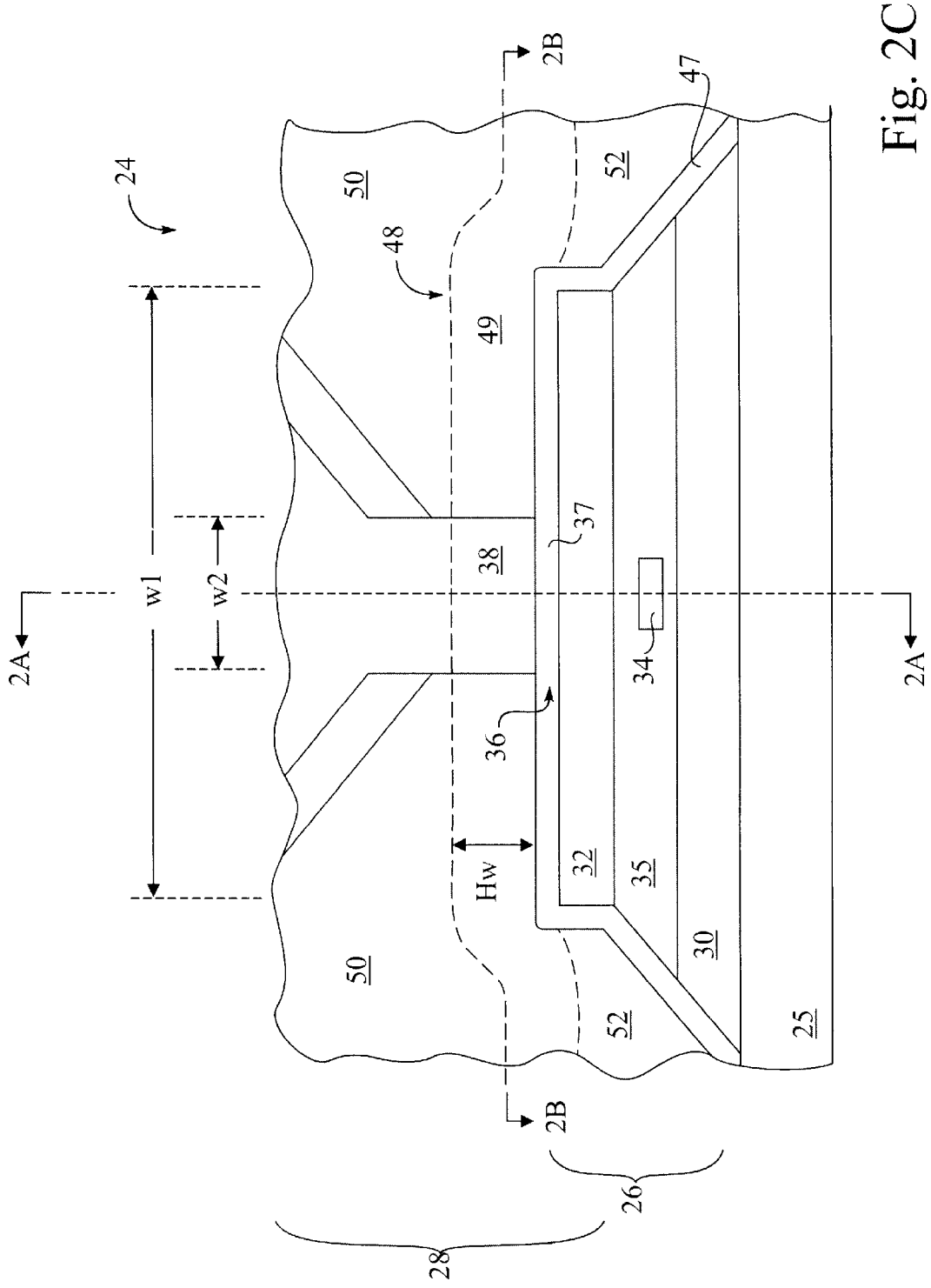
FIG. 2C is a plan view taken along line 2C—2C of FIG. 2A.
Figure 2D:
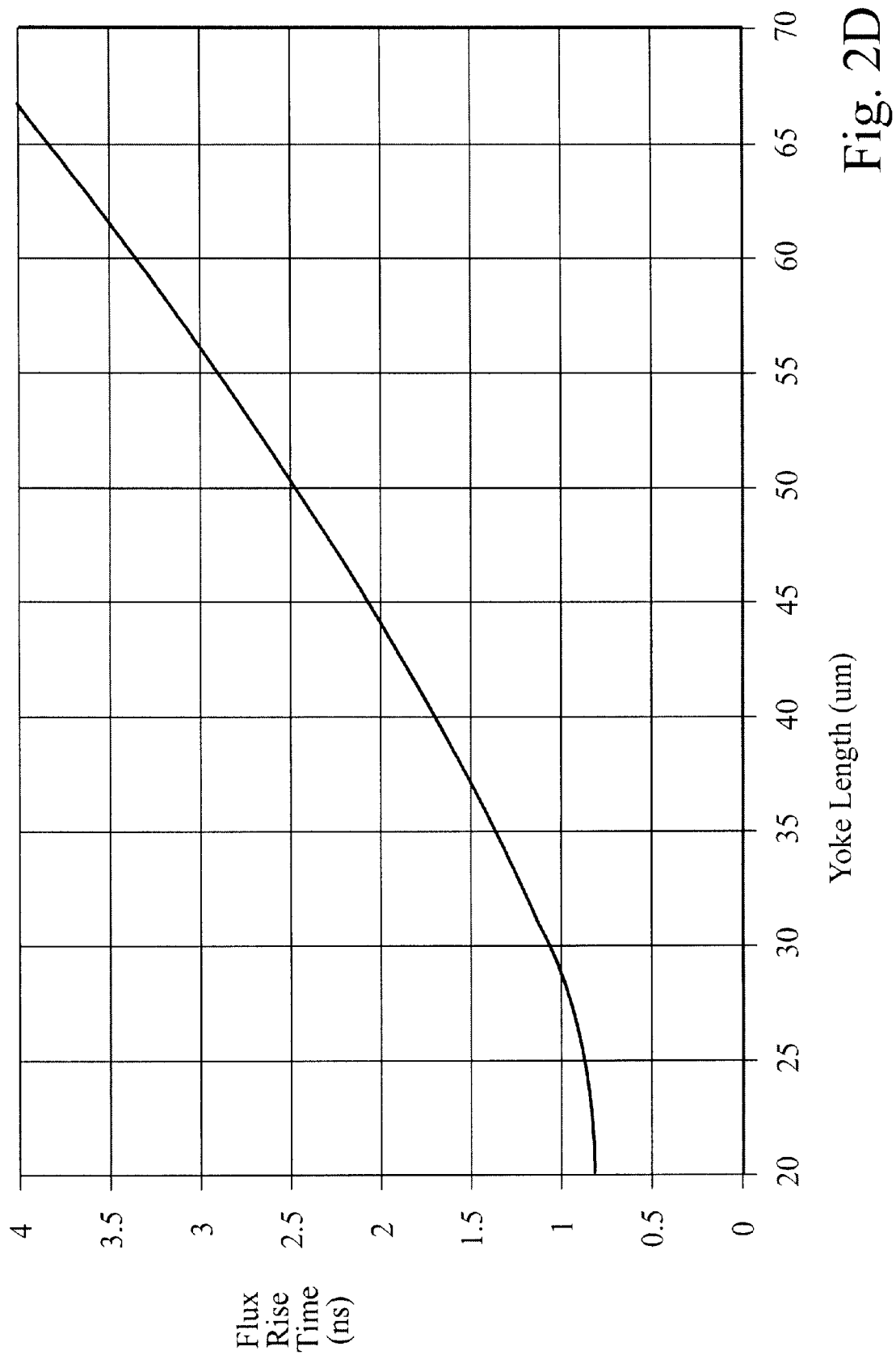
FIG. 2D is a representative graph of a relationship between yoke length and flux rise time.
Figure 3:
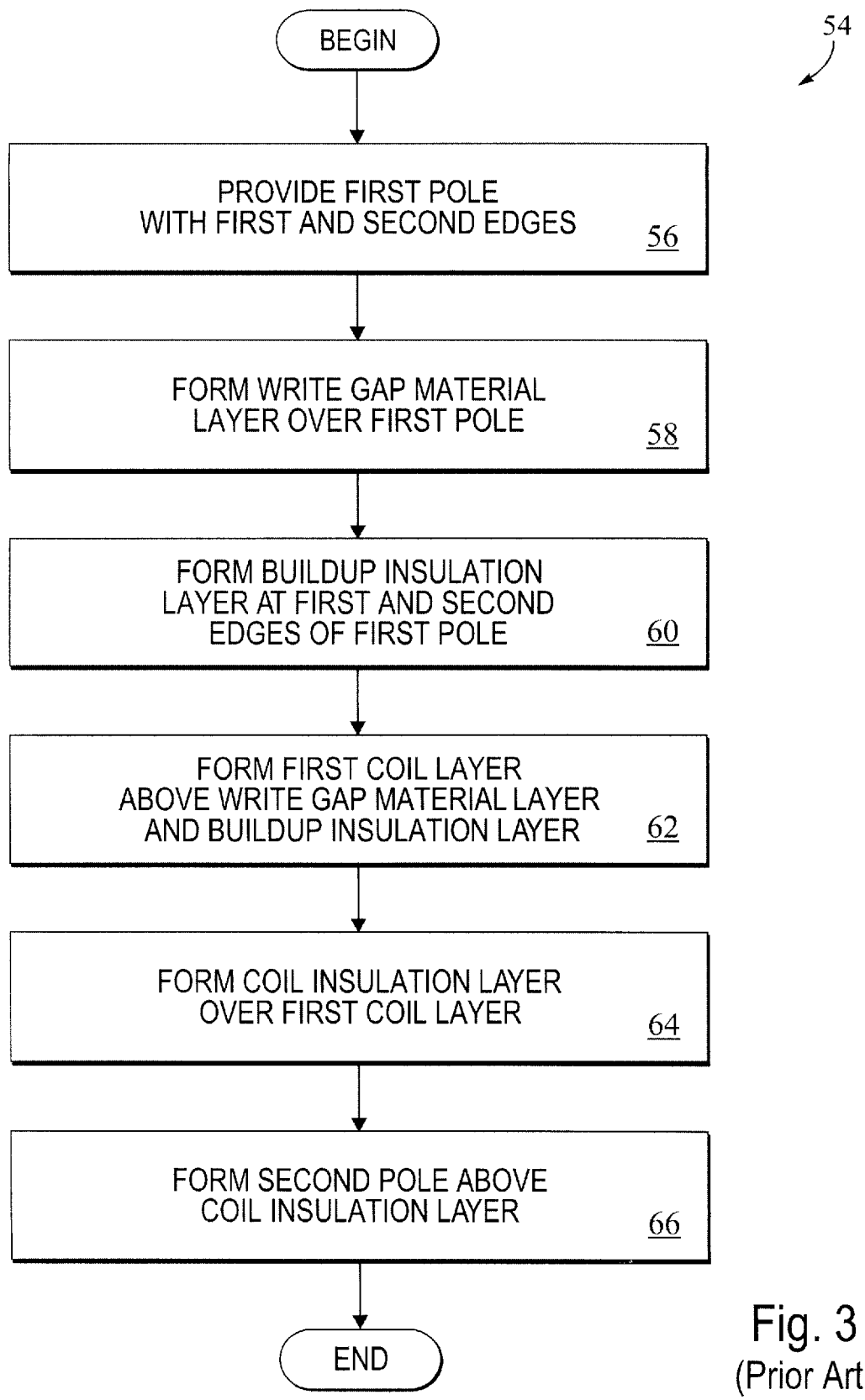
FIG. 3 is a process diagram of a method for forming a write element of the prior art.
Figure 4A:
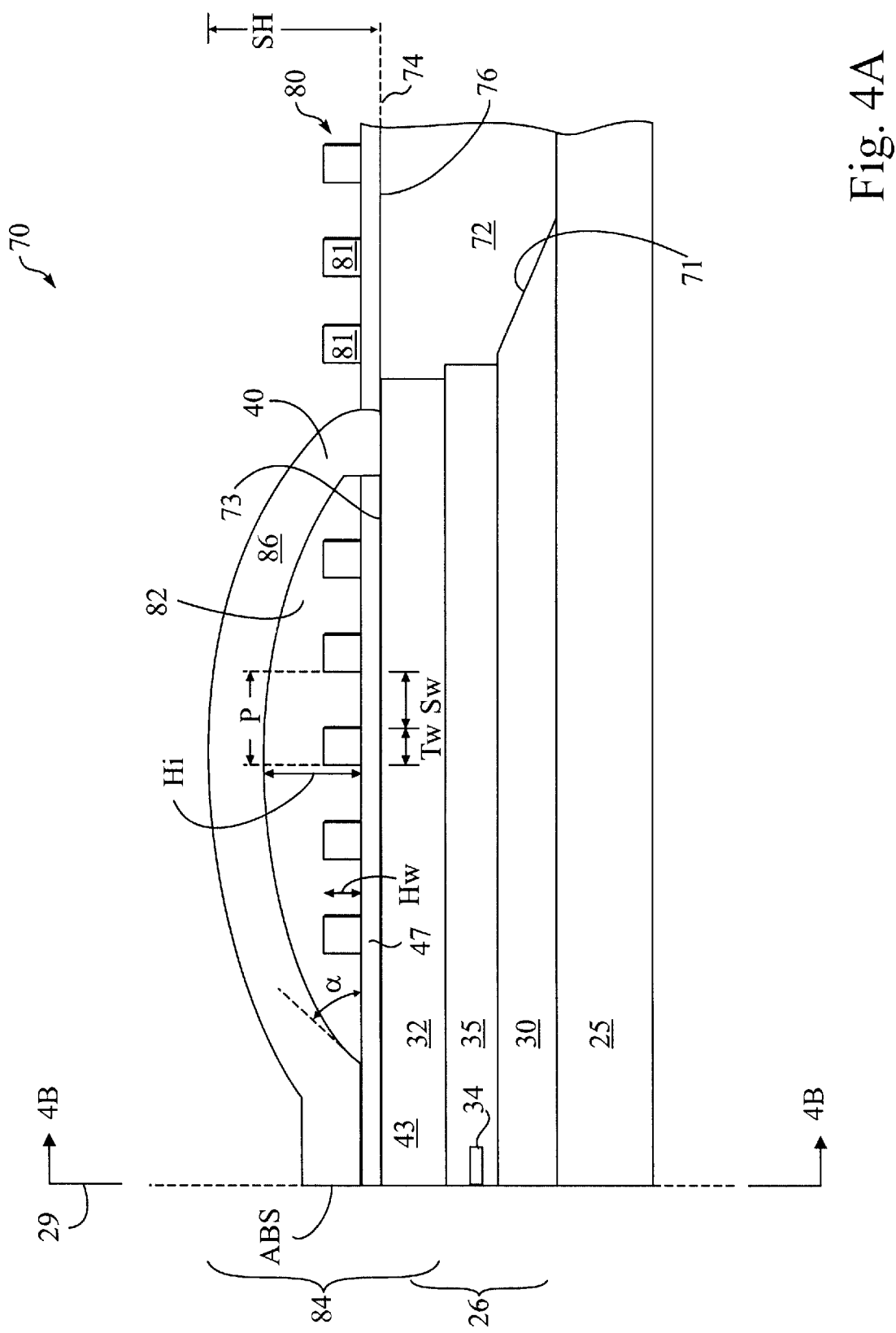
FIG. 4A is a cross-sectional side view of a write element, according to an embodiment of the present invention.
Figure 4B:
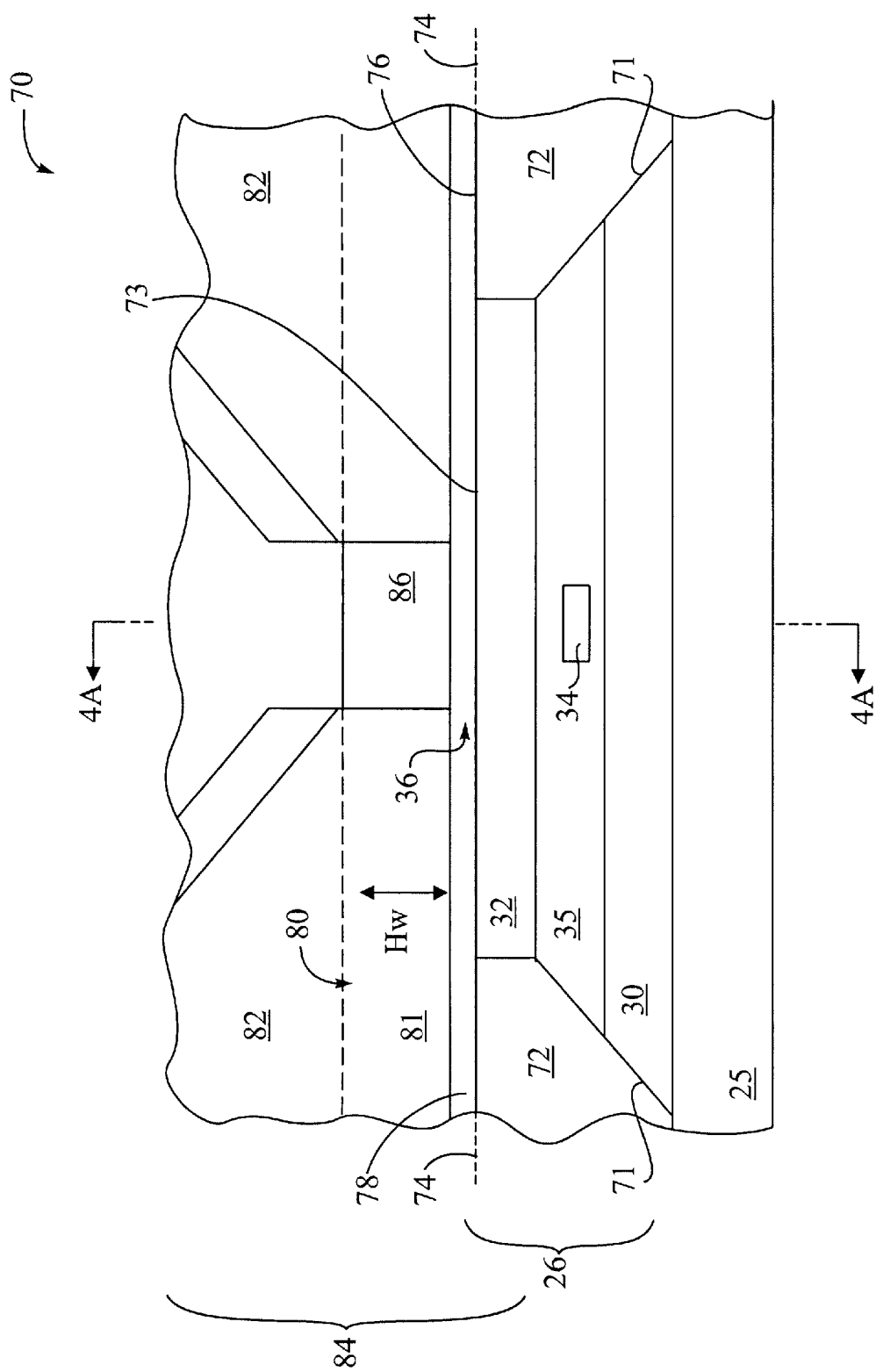
FIG. 4B is an ABS view taken along line 4B—4B of FIG. 4A.
Figure 5:
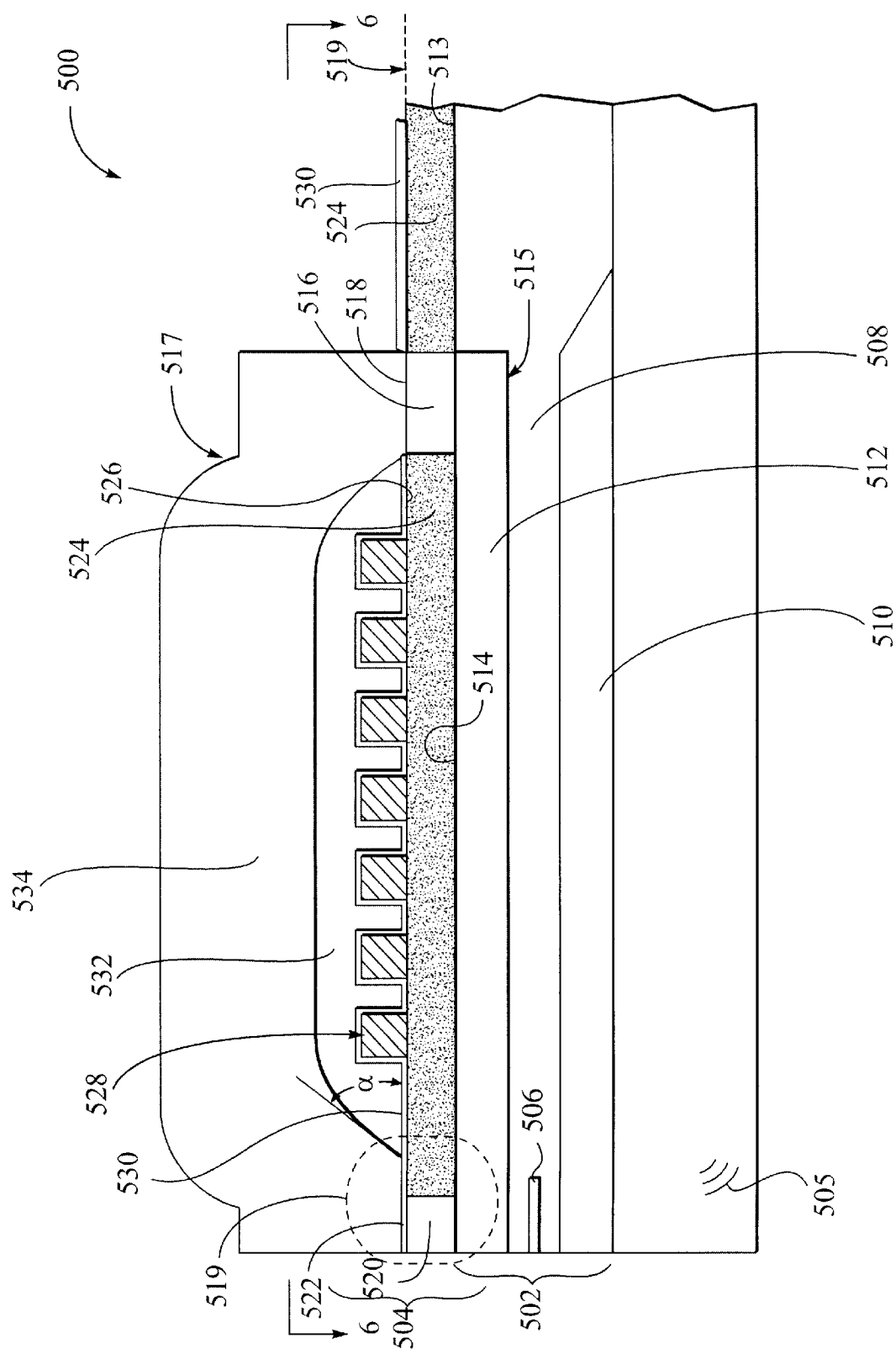
FIG. 5 is a cross sectional view of a read/write head of the present invention.

With reference to FIG. 5, the present invention is embodied in a read/write head generally designated 500, including a read portion 502 and a write portion 504 both of which are supported upon a substrate 505. The read portion includes a read element 506 embedded within a dielectric material 508 between first and second shields 510 and 512 respectively. The second shield has a planar top surface 514 and also serves as a portion of a first pole 515 for the write portion 504 of the head 500. The dielectric material 508 extends beyond the edges of the shield/pole 512 to rise to a planar top surface 513 flush with the top surface 514 of the shield/pole 512.

The write portion 504 includes first and second poles 515 and 534 which join to form a yoke 517. The yoke contains a portion of a conducting coil 528 which is covered by a write gap material 530 which also separates the first and second pole at a write gap portion 519 at the front end of the yoke 517.

Figure 6:
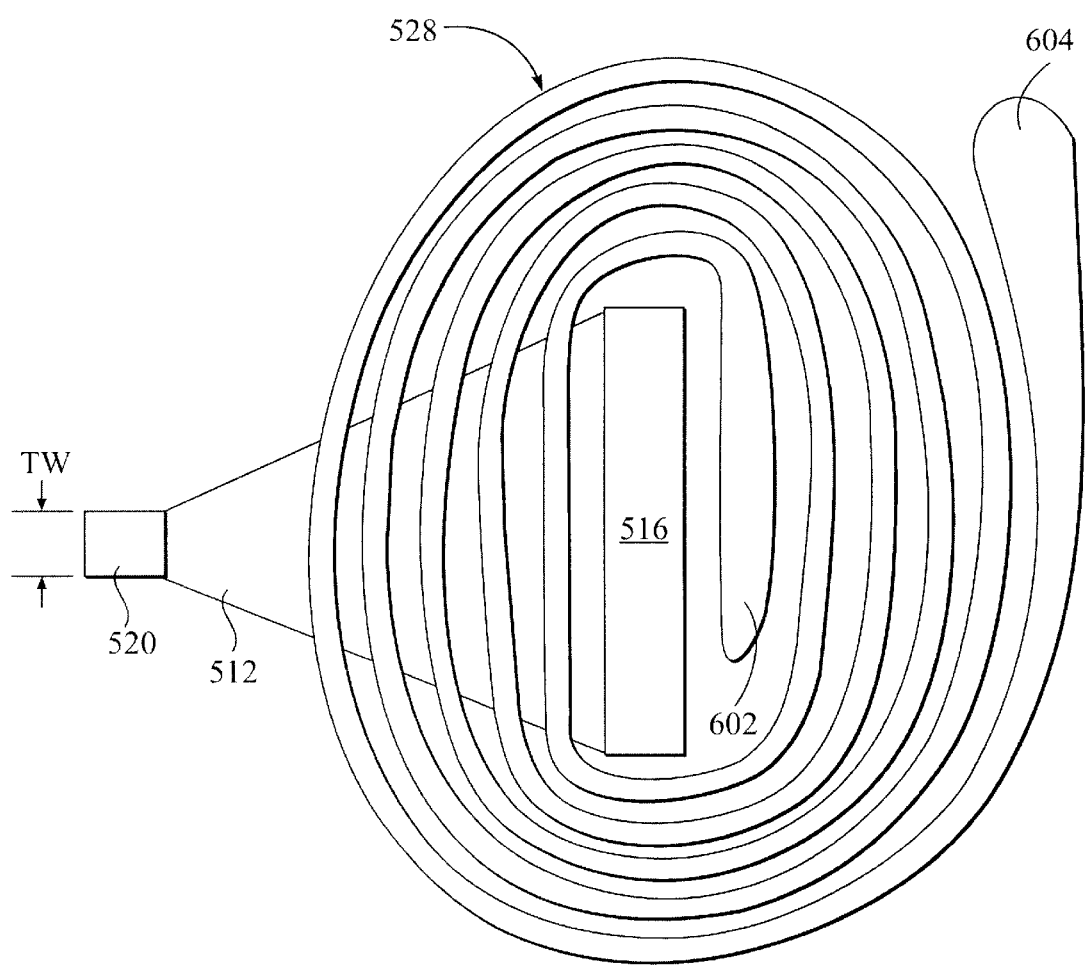
FIG. 6 is a plan view taken along line 6—6 of FIG. 5.

The first pole 515 includes a back gap pedestal 516 which extends from the planar upper surface 514 at a back end of the first pole 515. The back gap pedestal 516 of the first pole 515 has a smooth, planar upper surface 518 which defines a plane 519. In addition, the first pole 515 includes at its front end a write gap pedestal 520 extending upward from the planar sur face 514 of the first pole 515 at the front end of the first pole 515. The write gap pedestal 520 also has a smooth. planar upper surface 522 which is coplanar with the upper surface 518 of the back gap pedestal 516 and the plane 519. As can be seen more clearly with reference to FIG. 6, the write gap pedestal 520 has a much smaller upper surface area than the back gap pedestal 516. The width of the write gap pedestal 520 defines the track width (TW) of write element 504.

The pedestals 516 and 520 are constructed of a highly magnetic, high saturation moment (high Bsat) material. While several high Bsat materials could be used, such as for example: FeN, FeRhN, or FeTaN, the pedestals are preferably constructed of $Ni_{45}Fe_{55}$. Although the pole/shield 512 is constructed of a material having a lower saturation moment than that of the pedestals 516 and 520, the pole/shield has a larger cross sectional area. The magnetic properties of the high Bsat pedestals in conjunction with the larger area of the shield/pole 512 allow magnetic flux to efficiently flow through the yoke 517 and to concentrate at the pedestals. This provides a stronger magnetic fringing field at the write gap portion 519 of the write element 504. Alternatively, the entire first pole 515 could be constructed of such a high Bsat material, in which case the present invention would provide the same corrosion protection as with the previously described embodiment.

With continued reference to FIG. 5, a chemical mechanical polished (CMP) dielectric layer 524 surrounds the back gap and write gap portions 516 and 520 and fills the space there between. In the preferred embodiment the insulation 524 is constructed of $Al_2O_3$, however other materials could be used as well. The CMP process smoothes and planarizes the upper surfaces 518 and 522 of the back gap and write gap pedestals 516 and 520 respectively and produces a smooth planar surface 526 on the dielectric layer which is flush with the surfaces 518 and 522 of the back gap and write gap pedestals 516 and 520 respectively.

Upon the dielectric layer 524 is formed a conductive coil 528. While the coil 528 could be constructed of many materials it is preferably made of copper. The smooth planar surface 526 of the dielectric layer 524 provides an excellent substrate on which to form the coil 528, allowing the coil 528 to be more precisely deposited. This allows the coil 528 to be formed with a smaller pitch than would otherwise be possible, increasing the performance of the write head 504 as described above. The coils 528 are provided with inner and outer contacts, 602 and 604 respectively (FIG. 6), which can be used to supply an electrical current to the coil 528 in the completed write head 504.

A layer of write gap material 530 covers the coil 528 as well as the dielectric layer 524 and write gap pedestal 520. The write gap material is removed to provide a via at the location of the back gap pedestal 516 by an etching process which will be described in more detail below. While various materials can be used as write gap material, in the preferred embodiment the write gap material 530 is $SiO_2$.

An insulation layer 532 covers the write gap material 530 and is formed with vias at the write gap and back gap pedestals 520 and 516 respectively. The insulation is also provided with vias at the location of the contacts 602 and 604 of the coil 528. 30 While the insulation layer could be formed of many non-conducting materials, it is preferably formed of a cured photoresist. Using $SiO_2$ as the write gap material 530 allows the insulation layer to be processed to have an advantageously smoothly sloped edge at the location of the write gap portion 519 of the yoke 517.

Formed over the insulation layer 532 is a second pole 534. The second pole is formed of a magnetic material and is plated onto the insulation layer 532 and on top of the back gap pedestal 516 of the first pole 512. The front end of the second pole 534 sits atop the write gap material 522 above the write gap pedestal 520.

Figure 7:
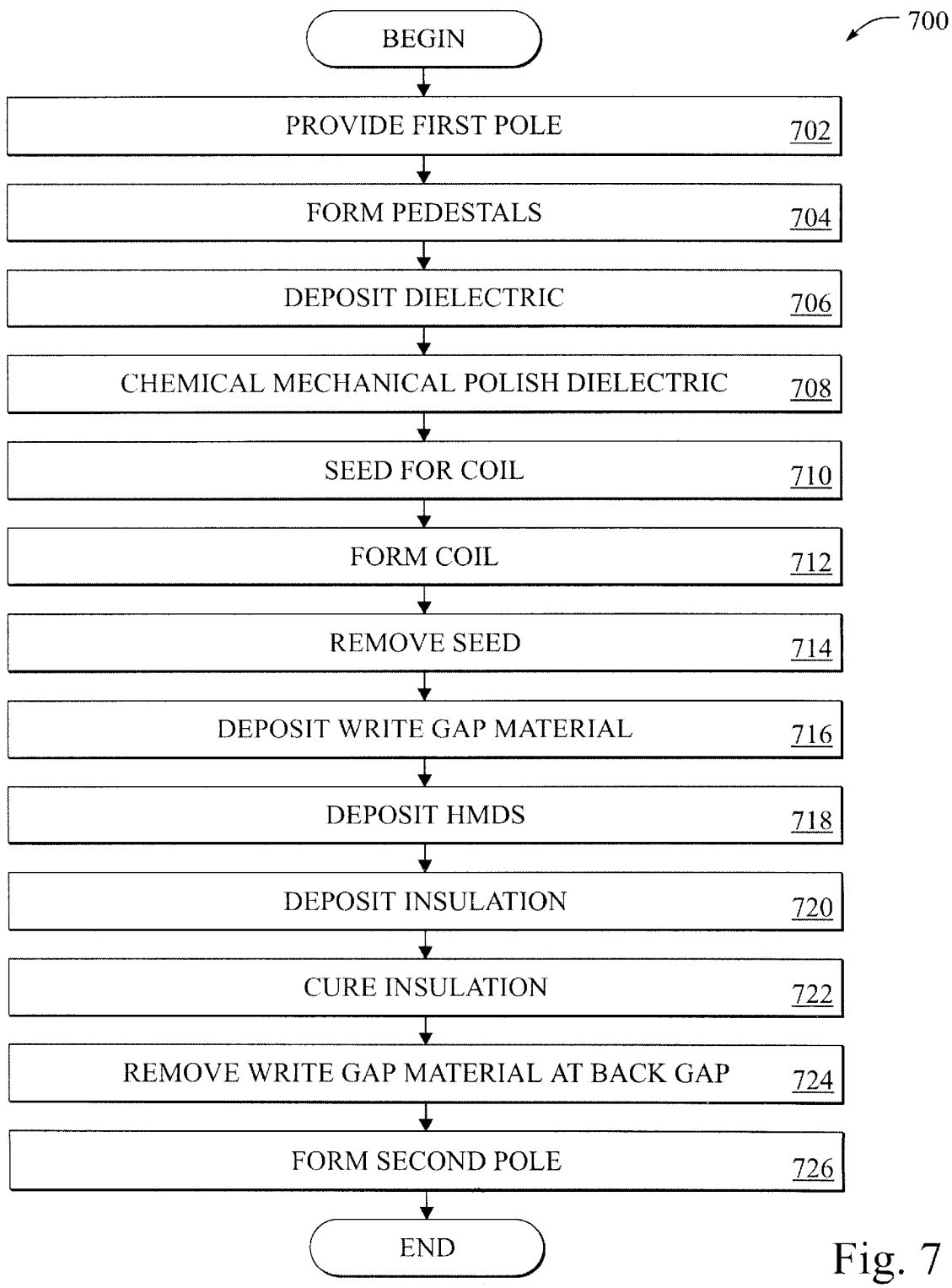
FIG. 7 is a process diagram of a method for forming a read/write head of the present invention.

FIG. 7 illustrates a process 700 for constructing a write head 504 of the present invention. In a step 702 the first pole/shield 512 is provided. The first pole/shield can be constructed of any suitable magnetic material, such as $Ni_{80}Fe_{20}$. The back gap and write gap pedestals 516 and 520 are then formed onto the first pole 512 in a step 704 to form the completed first pole 515. The pedestals can be formed of any magnetic material but are preferably a high saturation moment (high Bsat) material such as $Ni_{45}Fe_{55}$, and are formed by a photolithographic process as will be understood by those skilled in the art. Then in a step 706, the dielectric layer 514 is deposited onto the first pole 512 so as to cover and surround the pedestals 516 and 520. This dielectric layer 514 is then planarized by a chemical mechanical polishing (CMP) step 708. The chemical mechanical polish is performed until the tops 518 and 522 of the back gap and write gap pedestals 516 and 520 respectively are exposed and planarized. This will result in a smooth flat surface across the insulation layer 514 and the pedestals 518 and 520.

The smooth surface 526 of the dielectric layer provided by the CMP process is ideal for deposition of the conductive coil 528. Preparatory to forming the coil 528, a seed layer is deposited onto the dielectric layer 514 in a step 710. The coil is then deposited in a step 712 using photolithography and the seed layer subsequently removed by etching in a step 714. With the coil 528 formed and the seed layer removed the write gap material 530 can be deposited as a thin film in a step 716. The $SiO_2$ write gap material can be deposited by plasma enhanced CVD, inductively coupled plasma CVD, RF sputtering, or ion beam deposition.

Prior to depositing the insulation layer 532, a thin HMDS layer is deposited in a step 718. The HMDS can be as thin as one atomic layer and acts as a glue to hold the insulation layer 532 to the write gap material 530. With the HMDS layer deposited, the insulation layer 532 is deposited in a step 720. The insulation layer 532 is spun on and masked to leave the pedestals 518 and 520 exposed and to leave vias at the locations of the contacts 602 and 604. The insulation layer is then cured in a step 722. Using HMDS coated $SiO_2$ as the write gap material causes the cured insulation layer to take on a gradually sloped shape at the location of the write gap portion 519 of the yoke write head 504. After curing the insulation layer, the write gap material is removed in a step 724 using a photolithographic process and reactive ion etching to remove the write gap material only at the location of the back gap pedestal 516 and the coil contacts 602 and 604.

The highly magnetic (high Bsat) material of which the back gap pedestal is made is extremely corrosive at high temperatures. This property of high Bsat material has heretofore prevented their use in applications such as that of the present invention. By keeping the pedestals 516 and 520 covered by the write gap material 530 during the high temperature cure of the insulation layer 532, the pedestal 516 remains protected from corrosion. Once the high temperature cure of the insulation has been completed, the write gap material can be removed over the pedestal 516 without harming the pedestal.

After the write gap material 530 has been removed over the back gap pedestal 516, the second pole 534 is formed in a step 726. The second pole 534 is deposited by a photolithographic plating process and is formed so as to contact the back gap pedestal 516 and sit atop the write gap material at the write gap portion 519 and atop the insulation layer 532. The smooth slope of the insulation layer near the write gap portion of the write head 504 causes the plated second pole 534 to define a low apex angle $\alpha$. As described above, this low apex angle improves the magnetic performance and reliability of the write head 504.

In an alternate embodiment of the invention the second pole 534 is formed by DC or RF sputtering rather than by plating. The low apex angle α of the present invention makes the use of sputtering possible. Whereas plating is restricted to material such as $Ni_{45}Fe_{55}$ or $Ni_{80}Fe_{20}$, sputtering allows the second pole to be constructed of other materials such as for example: FeN, FeRhN, or FeTaN. This can advantageously increase the magnetic flux from about 16 KGauss to about 20 KGauss. In yet another embodiment of the invention the entire pole, including the pole/shield 512, as well as the pedestals 518 and 520 are constructed of a high Bsat material such as $Ni_{45}Fe_{55}$.

In another embodiment of the invention, not shown, the entire first pole can be constructed of a high Bsat material. Such a write head would be constructed in essentially the same manner as the write head of the preferred embodiment in that the entire pole, including the pedestals would remain covered by the write gap material during curing of the subsequently applied insulation layer, the first pole will be protected from corrosion.

In yet another embodiment of the invention, also not shown, the first pole does not include pedestals at the back gap or write gap pedestals. The first pole is formed of a high Bsat material which is protected from corrosion during the high temperature cure of the subsequently applied insulation layer. As with the previously described preferred embodiment, the write gap material is etched after curing of the insulation layer in order to expose the back gap portion of the first pole.

From the above it can be appreciated that the present invention provides a write head, and a method of manufacturing same, which can effectively use high Bsat materials to increase magnetic performance while solving the corrosion problems inherent in the use of such high Bsat materials. By covering the back gap pedestal with the write gap material during the high temperature cure of the insulation layer, corrosion of the pedestal is prevented. Additionally, depositing the write gap material on top of the coil rather than beneath the coil eliminates the problem of write gap degradation during the removal of the coil seed. While the invention has been described herein in terms of several preferred embodiments, other embodiments of the invention, including alternatives, modifications, permutations and equivalents of the embodiments described herein, will be apparent to those skilled in the art from consideration of the specification, study of the drawings, and practice of the invention. For example, the write head could include multiple coils. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A write element for a thin film magnetic head, comprising:
   a first pole including a front end having a substantially planar first top surface, and a back end;
   a dielectric layer disposed over the first pole and including a second top surface that is substantially coplanar with the first top surfaces
   a coil layer disposed over the dielectric layer and including multiple winds of a conductor and separations between adjacent winds;
   a second pole disposed over the first pole and contacting the first pole at the back end; and
   a write gap layer disposed between the first and second poles, over the front end of the first pole, and over the coil layer, and at least partially filling the separations between adjacent winds.

2. The write element of claim 1 wherein the first pole includes $Ni_{80}Fe_{20}$.

3. The write element of claim 2 wherein the second pole includes $Ni_{80}Fe_{20}$.

4. The write element of claim 1 wherein the first pole includes a high Bsat material.

5. The write element of claim 4 wherein the high Bsat material is $Ni_{45}Fe_{55}$.

6. The write element of claim 4 wherein the second pole includes a high Bsat material.

7. The write element of claim 6 wherein the high Bsat material in the second pole is $Ni_{80}Fe_{20}$.

8. The write element of claim 1 wherein the first pole further includes at the front end a first pole pedestal having the first top surface.

9. The write element of claim 8 wherein the first pole pedestal includes a high Bsat material.

10. The write element of claim 9 wherein the high Bsat material is $Ni_{45}Fe_{55}$.

11. The write element of claim 1 wherein the back end of the first pole has a third top surface that is substantially coplanar with the first top surfaces.

12. The write element of claim 11 wherein the first pole further includes at the back end a back gap pedestal having the third top surface.

13. The write element of claim 12 wherein the back gap pedestal includes a high Bsat material.

14. The write element of claim 13 wherein the high Bsat material is $Ni_{45}Fe_{55}$.

15. The write element of claim 1 further comprising an insulation layer disposed between the write gap layer and the second pole.

16. The write element of claim 15 wherein the insulation layer partially fills the separations between adjacent winds.

17. The write element of claim 15 wherein the insulation layer includes cured photoresist.

18. The write element of claim 15 wherein the insulation layer defines an apex angle of less than 50 degrees.

19. The write element of claim 1 wherein the dielectric layer includes $Al_2O_3$.

20. A thin film magnetic read/write head comprising:
   a first pole including a back end and a front end;
   a first pole pedestal disposed over the front end of the first pole and including a first top surface;
   a first dielectric layer disposed over the first pole and including a second top surface that is substantially coplanar with the first top surface;
   a coil layer disposed over the first dielectric layer and including multiple winds of a conductor and separations between adjacent winds;
   a second pole disposed over the first pole and contacting the first pole at the back end;
   a write gap layer disposed between the first and second poles over the front end of the first pole pedestal and over the coil layer, and at least partially filling the separations between adjacent winds;
   a second dielectric layer disposed under the first pole;
   a read element embedded within the second dielectric layer; and
   a shield disposed under the second dielectric layer.

21. The read/write head of claim 20 wherein the first pole includes a high Bsat material.

22. The read/write head of claim 21 wherein the high Bsat material is $Ni_{45}Fe_{55}$.

23. The read/write head of claim 21 wherein the second pole includes a high Bsat material.

24. The read/write head of claim 23 wherein the high Bsat material in the second pole is $Ni_{80}Fe_{20}$.

25. The read/write head of claim 20 wherein the first pole pedestal includes a high Bsat material.

26. The read/write head of claim 25 wherein the high Bsat material is $Ni_{44}Fe_{55}$.

27. The read/write head of claim 20 wherein the back end of the first pole has a third top surface that is substantially coplanar with the first top surface.

28. The read/write head of claim 20 further comprising a back gap pedestal disposed over the back end of the first pole and including the third top surface.

29. The read/write head of claim 28 wherein the back gap pedestal includes a high Bsat material.

30. The read/write head of claim 29 wherein the high Bsat material is $Ni_{45}Fe_{55}$.

31. The read/write head of claim 20 further comprising an insulation layer disposed between the write gap layer and the second pole.

32. The read/write head of claim 31 wherein the insulation layer partially fills the separations between adjacent winds.

33. The read/write head of claim 31 wherein the insulation layer includes cured photoresist.

34. The read/write head of claim 31 wherein the insulation layer defines an apex angle of less than 50 degrees.

* * * * *